(12) United States Patent  
Matsubara et al.

(10) Patent No.: US 12,499,968 B2  
(45) Date of Patent: Dec. 16, 2025

(54) SEMICONDUCTOR DEVICE HAVING FUSE ARRAY

(71) Applicant: MICRON TECHNOLOGY, INC., Boise, ID (US)

(72) Inventors: Yasushi Matsubara, Kanagawa (JP); Minoru Someya, Tokyo (JP)

(73) Assignee: MICRON TECHNOLOGY, INC., Boise, ID (US)

( * ) Notice: Subject to any disclaimer, the term of this patent is extended or adjusted under 35 U.S.C. 154(b) by 176 days.

(21) Appl. No.: 18/402,096

(22) Filed: Jan. 2, 2024

(65) Prior Publication Data

US 2024/0265992 A1 Aug. 8, 2024

Related U.S. Application Data

(60) Provisional application No. 63/483,579, filed on Feb. 7, 2023.

(51) Int. Cl.
| | |
|---|---|
| G11C 17/16 | (2006.01) |
| G11C 17/18 | (2006.01) |
| G11C 29/00 | (2006.01) |
| G11C 29/44 | (2006.01) |

(52) U.S. Cl.
CPC ............ *G11C 29/787* (2013.01); *G11C 17/18* (2013.01); *G11C 29/44* (2013.01); *G11C 29/76* (2013.01)

(58) Field of Classification Search
CPC . G11C 17/14–18; G11C 29/787; G11C 29/44; G11C 29/76
See application file for complete search history.

(56) References Cited

U.S. PATENT DOCUMENTS

2019/0311778 A1 10/2019 Lee

*Primary Examiner* — Alfredo Bermudez Lozada  
(74) *Attorney, Agent, or Firm* — DORSEY & WHITNEY LLP

(57) ABSTRACT

An apparatus includes a memory chip including a plurality of fuse units, and a controller chip. Each fuse unit includes a fuse array having a plurality of fuse cells, a first register, and a second register. The controller is configured to set the fuse address in the second register included in selected one or more of the plurality of fuse units, set the match signal in the first register included in the selected one or more of the plurality of fuse units, and send a blow signal to the memory chip. Each of the selected one or more of the plurality of fuse units is configured to blow one of the plurality of fuse cells selected by the fuse address stored in the second register responsive to the blow signal.

20 Claims, 20 Drawing Sheets

(*) V : valid, N : invalid

| A12F=1 | | AF_Unit_# (Qid[1:0]) | | | |
|---|---|---|---|---|---|
| A14 | A13 | 11b | 10b | 01b | 00b |
| 0 | 0 | N | N | N | V |
| 0 | 1 | N | N | V | N |
| 1 | 0 | N | V | N | N |
| 1 | 1 | V | N | N | N |

FIG. 8

(*) V : valid, N : invalid

| A12T=1 | | | | AF_Unit_# (Qid[1:0]) | | | |
|---|---|---|---|---|---|---|---|
| A18 | A17 | A16 | A15 | 11b | 10b | 01b | 00b |
| 0 | 0 | 0 | 1 | N | N | N | V |
| 0 | 0 | 1 | 0 | N | N | V | N |
| 0 | 1 | 0 | 0 | N | V | N | N |
| 1 | 0 | 0 | 0 | V | N | N | N |
| 0 | 0 | 1 | 1 | N | N | V | V |
| 0 | 1 | 0 | 1 | N | V | N | V |
| 1 | 0 | 0 | 1 | V | N | N | V |
| 0 | 1 | 1 | 0 | N | V | V | N |
| ⋮ | | | | ⋮ | | | |
| 1 | 1 | 1 | 1 | V | V | V | V |

FIG. 14A (*) V : valid, N : invalid

| AFSel[3:0] | | | | AF_Unit_# (Qid[1:0]) | | | |
|---|---|---|---|---|---|---|---|
| [3] | [2] | [1] | [0] | 11b | 10b | 01b | 00b |
| 0 | 0 | 0 | 1 | N | N | N | V |
| 0 | 0 | 1 | 0 | N | N | V | N |
| 0 | 1 | 0 | 0 | N | V | N | N |
| 1 | 0 | 0 | 0 | V | N | N | N |
| 0 | 0 | 1 | 1 | N | N | V | V |
| 0 | 1 | 0 | 1 | N | V | N | V |
| 1 | 0 | 0 | 1 | V | N | N | V |
| 0 | 1 | 1 | 0 | N | V | V | N |
| ⋮ | | | | ⋮ | | | |
| 1 | 1 | 1 | 1 | V | V | V | V |

FIG. 14B

| DRAM slice_11 | | | | | | | | | | | | | | | | | | | | |
|---|---|---|---|---|---|---|---|---|---|---|---|---|---|---|---|---|---|---|---|---|
| AF_Unit_3 | GATE | BA | [17] | [16] | [15] | [14] | [13] | [12] | [11] | [10] | [9] | [8] | [7] | [6] | [5] | [4] | [3] | [2] | [1] | [0] |
| | | | | | | | | | | | | | | | | | | | | FA |
| | 3 | 8 | 0 | 0 | 0 | 0 | 0 | 0 | 0 | 0 | 1 | 0 | 0 | 0 | 1 | 0 | 0 | 0 | 0 | 1 |

111

| DRAM slice_8 | | | | | | | | | | | | | | | | | | | | |
|---|---|---|---|---|---|---|---|---|---|---|---|---|---|---|---|---|---|---|---|---|
| AF_Unit_1 | GATE | BA | [17] | [16] | [15] | [14] | [13] | [12] | [11] | [10] | [9] | [8] | [7] | [6] | [5] | [4] | [3] | [2] | [1] | [0] |
| | | | | | | | | | | | | | | | | | | | | FA |
| | 12 | 4 | 0 | 0 | 0 | 0 | 0 | 0 | 1 | 0 | 0 | 0 | 0 | 1 | 1 | 0 | 1 | 0 | 0 | 0 |

108

| DRAM slice_2 | | | | | | | | | | | | | | | | | | | | |
|---|---|---|---|---|---|---|---|---|---|---|---|---|---|---|---|---|---|---|---|---|
| AF_Unit_0 | GATE | BA | [17] | [16] | [15] | [14] | [13] | [12] | [11] | [10] | [9] | [8] | [7] | [6] | [5] | [4] | [3] | [2] | [1] | [0] |
| | | | | | | | | | | | | | | | | | | | | FA |
| | 4 | 2 | 0 | 0 | 0 | 1 | 0 | 0 | 0 | 0 | 1 | 0 | 1 | 0 | 0 | 0 | 0 | 0 | 0 | 1 |
| AF_Unit_2 | GATE | BA | [17] | [16] | [15] | [14] | [13] | [12] | [11] | [10] | [9] | [8] | [7] | [6] | [5] | [4] | [3] | [2] | [1] | [0] |
| | | | | | | | | | | | | | | | | | | | | FA |
| | 15 | 1 | 0 | 0 | 0 | 1 | 1 | 0 | 1 | 1 | 0 | 0 | 0 | 0 | 1 | 0 | 0 | 0 | 0 | 1 |

SEMICONDUCTOR DEVICE HAVING FUSE ARRAY

CROSS REFERENCE TO RELATED APPLICATION(S)

This application claims priority to U.S. Provisional Application No. 63/483,579, filed Feb. 7, 2023. The aforementioned application is incorporated herein by reference, in its entirety, for any purpose.

BACKGROUND

In a semiconductor memory device such as a DRAM (Dynamic Random Access Memory), a defective word line and a defective bit line are replaced with a spare word line and a spare bit line, respectively. The address of a defective word line and the address of a defective bit line are written in a fuse array formed of a plurality of fuse elements or a plurality of anti-fuse elements at a manufacturing stage. Since a writing operation to a fuse array takes a relatively long time, a technology for shortening the operating time is desired.

BRIEF DESCRIPTION OF THE DRAWINGS

FIG. 8 is a truth table for selecting a single unit:

FIGS. 14A and 14B are truth tables for selecting one or plural units;

FIG. 16 is a diagram showing an example of a state of anti-fuse units after programming;

DETAILED DESCRIPTION

Various embodiments of the present disclosure will be explained below in detail with reference to the accompanying drawings. The following detailed description refers to the accompanying drawings that show, by way of illustration, specific aspects, and various embodiments of the present disclosure. The detailed description provides sufficient detail to enable those skilled in the art to practice these embodiments of the present disclosure. Other embodiments may be utilized, and structural, logical, and electrical changes may be made without departing from the scope of the present disclosure. The various embodiments disclosed herein are not necessary mutually exclusive, as some disclosed embodiments can be combined with one or more other disclosed embodiments to form new embodiments.

Figure 1:
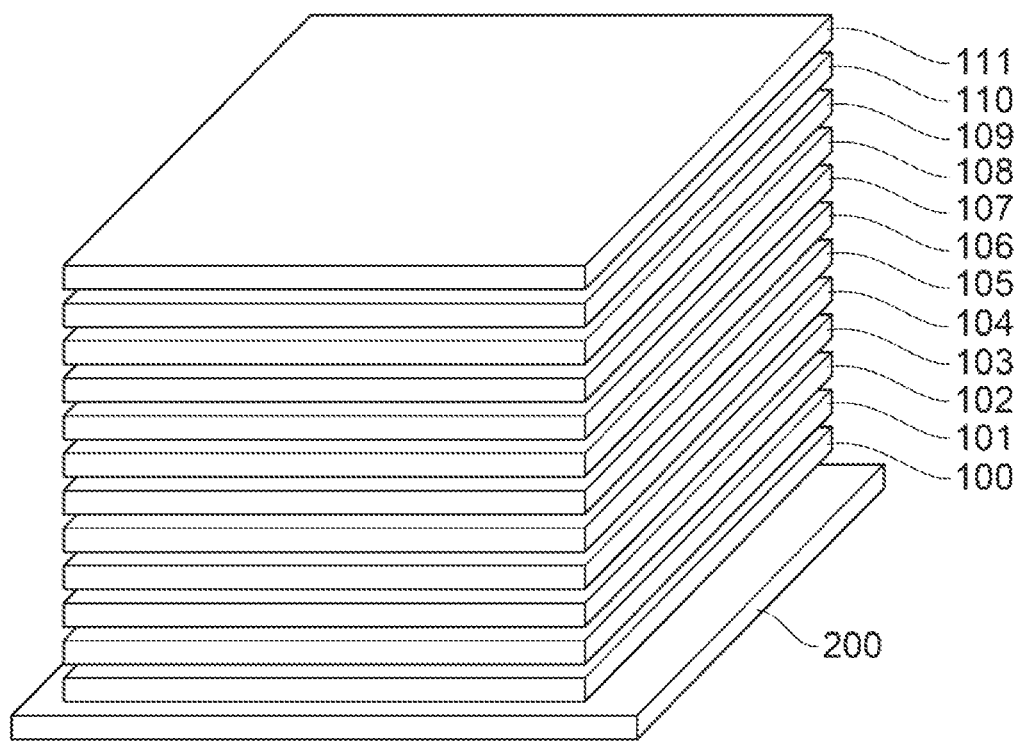
FIG. 1 is a schematic perspective view showing an exterior view of a semiconductor memory device according to the present disclosure.

FIG. 1 is a schematic perspective view showing an exterior view of a semiconductor memory device according to the present disclosure. As shown in FIG. 1, the semiconductor memory device according to the present disclosure includes a controller chip 200 and a plurality of memory chips 100 to 111 stacked on the controller chip 200. In the example shown in FIG. 1, 12 memory chips 100 to 111 are stacked; however, the number of stacked memory chips is not particularly limited to any number. A through silicon via referred to as TSV is provided on the memory chips 100 to 111, and the memory chips 100 to 111 and the controller chip 200 are coupled to each other through the TSV.

Figure 2:
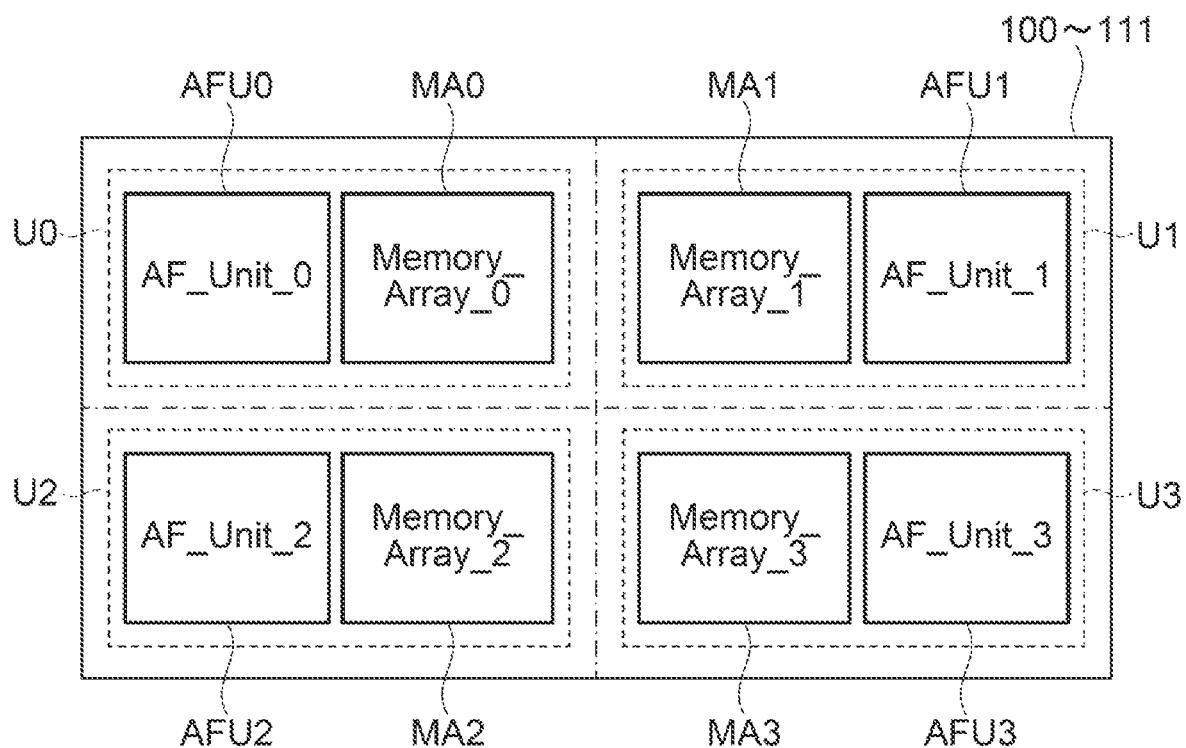
FIG. 2 is a schematic diagram for explaining a configuration of memory chips.

FIG. 2 is a schematic diagram for explaining a configuration of the memory chips 100 to 111. As shown in FIG. 2, each of the memory chips 100 to 111 includes four units U0 to U3. These four units U0 to U3 can be operated in a mutually asynchronous manner. Each of the units U0 to U3 includes one of memory cell arrays MA0 to MA3 and one of anti-fuse units AFU0 to AFU3. The anti-fuse units AFU0 to AFU3 are identified with a 2-bit identification signal Qid[1:0]. Values of the identification signal Qid[1:0] allocated to each of the anti-fuse units AFU0 to AFU3 are as shown in FIG. 2.

Figure 3:
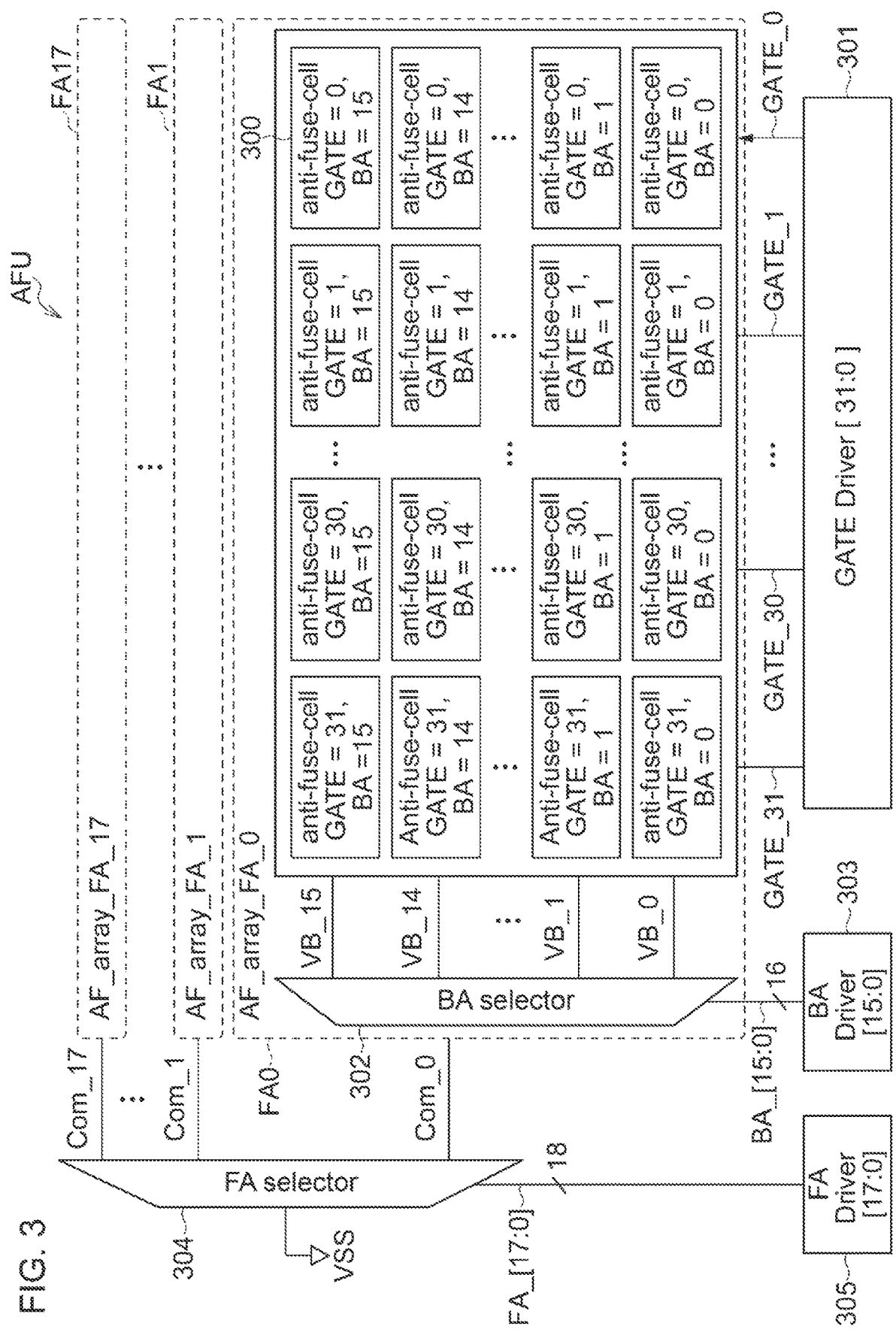
FIG. 3 is a block diagram showing a configuration of a main part of an anti-fuse unit.

FIG. 3 is a block diagram showing a configuration of a main part of an anti-fuse unit AFU. As shown in FIG. 3, the anti-fuse unit AFU includes a plurality of anti-fuse arrays FA0 to FA17. In the example shown in FIG. 3, 18 anti-fuse arrays FA0 to FA17 are included in one anti-fuse unit AFU: however, the number of anti-fuse arrays is not limited thereto. Each of the anti-fuse arrays FA0 to FA17 includes a plurality of anti-fuse cells 300. In the example shown in FIG. 3, 512 anti-fuse cells are included in one anti-fuse array. 16 anti-fuse cells among the 512 anti-fuse cells are simultaneously selected with 32-bit gate selection signals GATE_0 to GATE_31 supplied from a gate driver 301, and the 16 selected anti-fuse cells are respectively coupled to fuse wires VB_0 to VB_15. The fuse wires VB_0 to VB_15 are coupled to a bank selector 302. The bank selector 302 selects any of the fuse wires VB_0 to VB_15 based on 16-bit bank selection signals BA_0 to BA_15 supplied from a bank driver 303. The selected fuse wire is coupled to any corresponding one of common wires Com_0 to Com_17. The common wires Com_0 to Com_17 are coupled to a fuse array selector 304. The fuse array selector 304 selects any of the common wires Com_0 to Com_17 based on 18-bit fuse array selection signals FA_0 to FA_17 supplied from a fuse array driver 305. A ground potential VSS is supplied to the selected one of the common wires Com_0 to Com_17.

Figure 4:
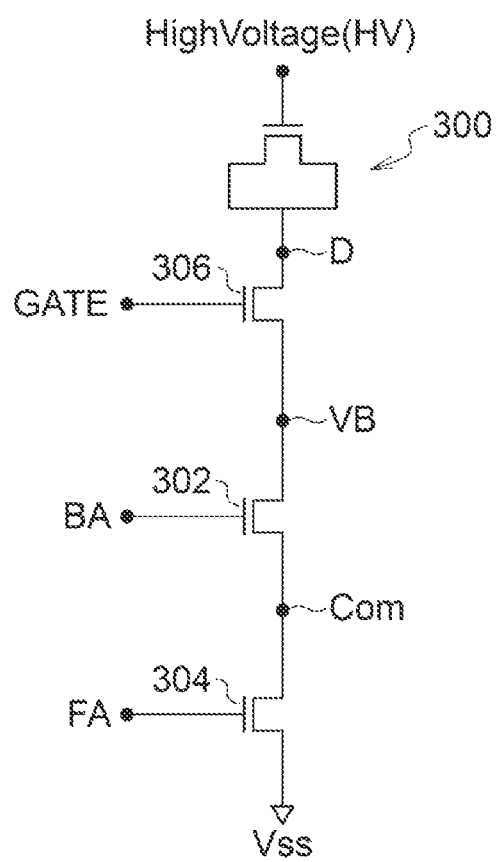
FIG. 4 is a circuit diagram of an anti-fuse cell.

FIG. 4 is a circuit diagram of the anti-fuse cell 300. As shown in FIG. 4, the anti-fuse cell 300 has a configuration in which a source and a drain of a MOS transistor are short-circuited, and a high voltage HV is applied to its gate electrode at the time of programming. Here, a node D of the anti-fuse cell 300 is coupled to the ground potential VSS via a transistor 306 selected with the gate selection signal GATE, a transistor included in the bank selector 302, and a transistor included in the fuse array selector 304. Therefore, when all the transistors 302, 304, and 306 are turned on, the high voltage HV is applied between the gate electrode and the source/drain of the anti-fuse cell 300. Consequently, the gate insulating film of the anti-fuse cell 300 is broken down. The anti-fuse cell 300 having its gate insulating film broken down is in a programmed state and its logic level is 1. The anti-fuse cell 300 not having its gate insulating film broken down is in an unprogrammed state and its logic level is 0.

Figure 5:
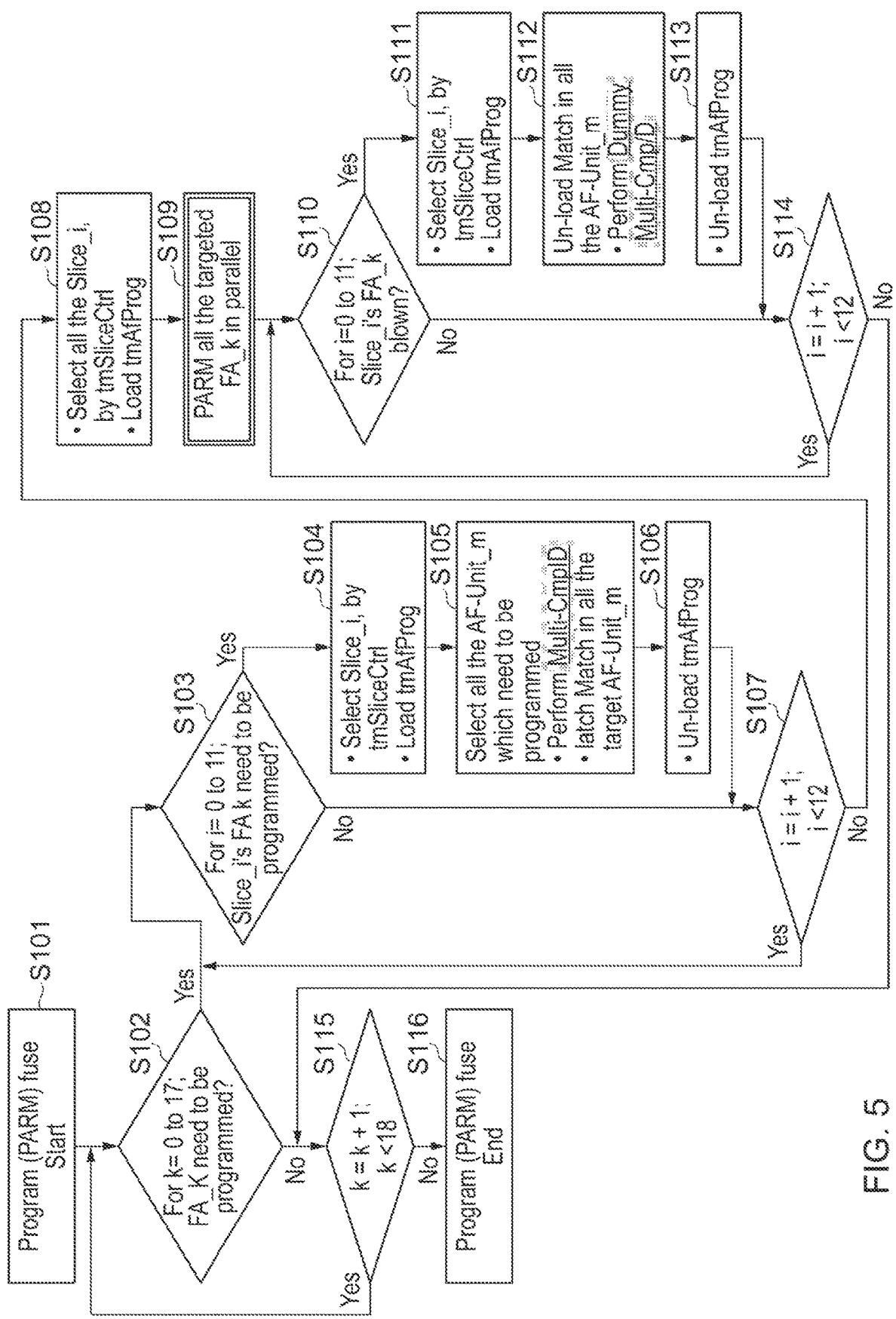
FIG. 5 is a flowchart for explaining a programming operation on the anti-fuse unit.
Figure 6:
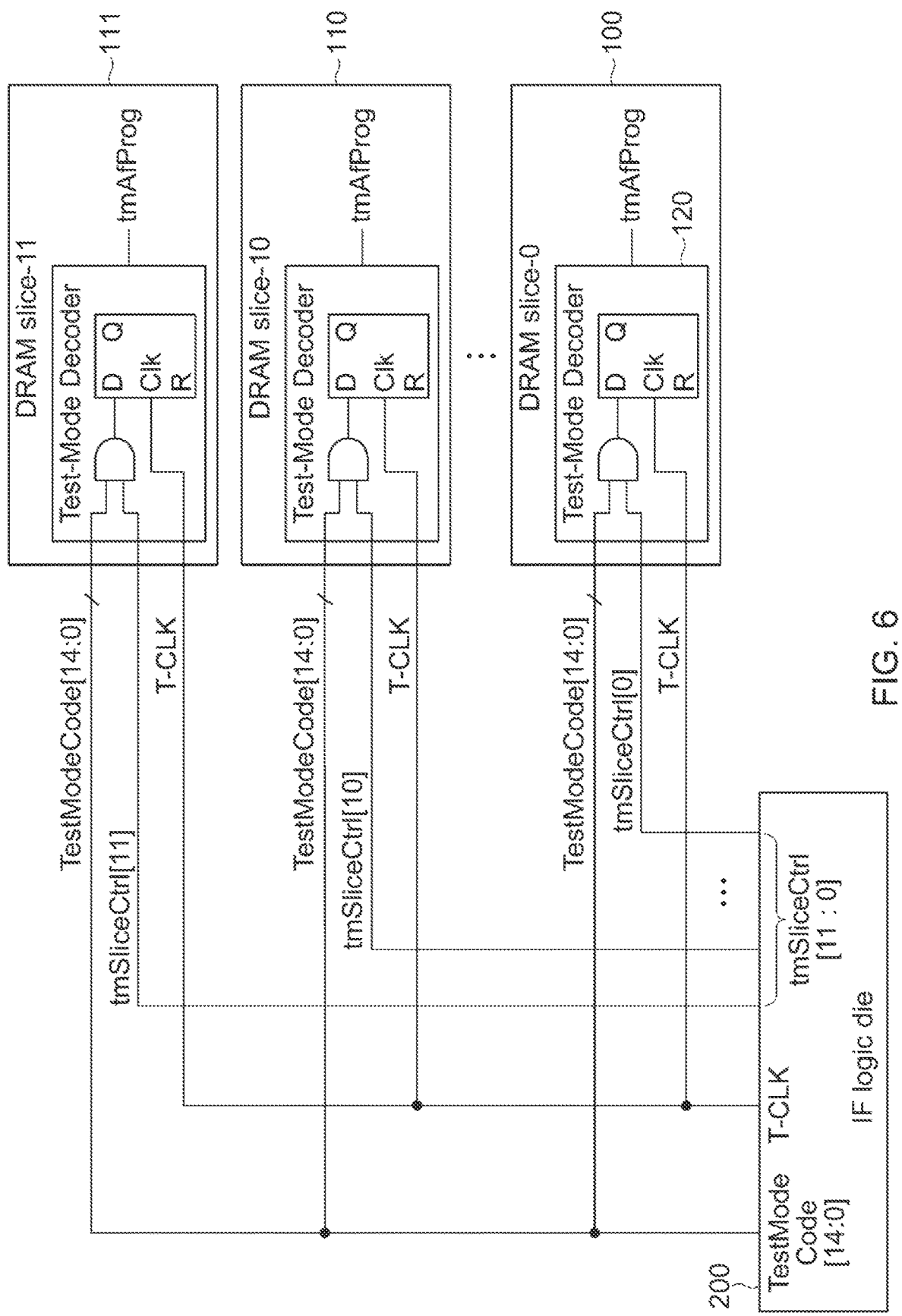
FIG. 6 is a diagram showing a coupling relation between memory chips and a controller chip.

FIG. 5 is a flowchart for explaining a programming operation on the anti-fuse unit AFU. First, when a programming operation is started (S101), one of the anti-fuse arrays FA0 to FA17 is selected (S102). The initial value of a parameter k used for selecting one of the anti-fuse arrays FA0 to FA17 is 0, so that the anti-fuse array FA0 is selected first. Next, when programming on the anti-fuse array FA0 is required in at least one of the anti-fuse units AFU0 to AFU3 included in at least one of the memory chips 100 to 111, one of the memory chips 100 to 111 is selected (S103). The initial value of a parameter i used for selecting one of the memory chips 100 to 111 is 0, so that the memory chip 100 is selected first. Thereafter, a programming signal tmAfProg is loaded in the memory chip selected from the memory chips 100 to 111 (S104). FIG. 6 is a diagram showing a coupling relation between the memory chips 100 to 111 and the controller chip 200. As shown in FIG. 6, a 12-bit chip selection signal tmSliceCtrl[11:0] supplied from the controller chip 200 is supplied to each of the memory chips 100 to 111. Further, a 15-bit test mode signal TestModeCode[14:0] and a test clock signal T-CLK supplied from the controller chip 200 are commonly supplied to the memory chips 100 to 111. Subsequently, for example, when the programming signal tmAfProg is loaded in the memory chip 100, a chip selection signal tmSliceCtrl[0] corresponding to the memory chip 100 is activated and the test mode signal TestModeCode[14:0] is set to be a value corresponding to the programming signal tmAfProg. With this process, a test mode decoder 120 in the memory chip 100 activates the programming signal tmAfProg while being synchronized with the test clock signal T-CLK. Next, when the programming signal tmAfProg is loaded in the memory chip 100 in this manner, loading of an identification code ID-CODE, the gate selection signal GATE, and the bank selection signal BA with respect to the anti-fuse unit AFU is performed (S105).

Figure 7:
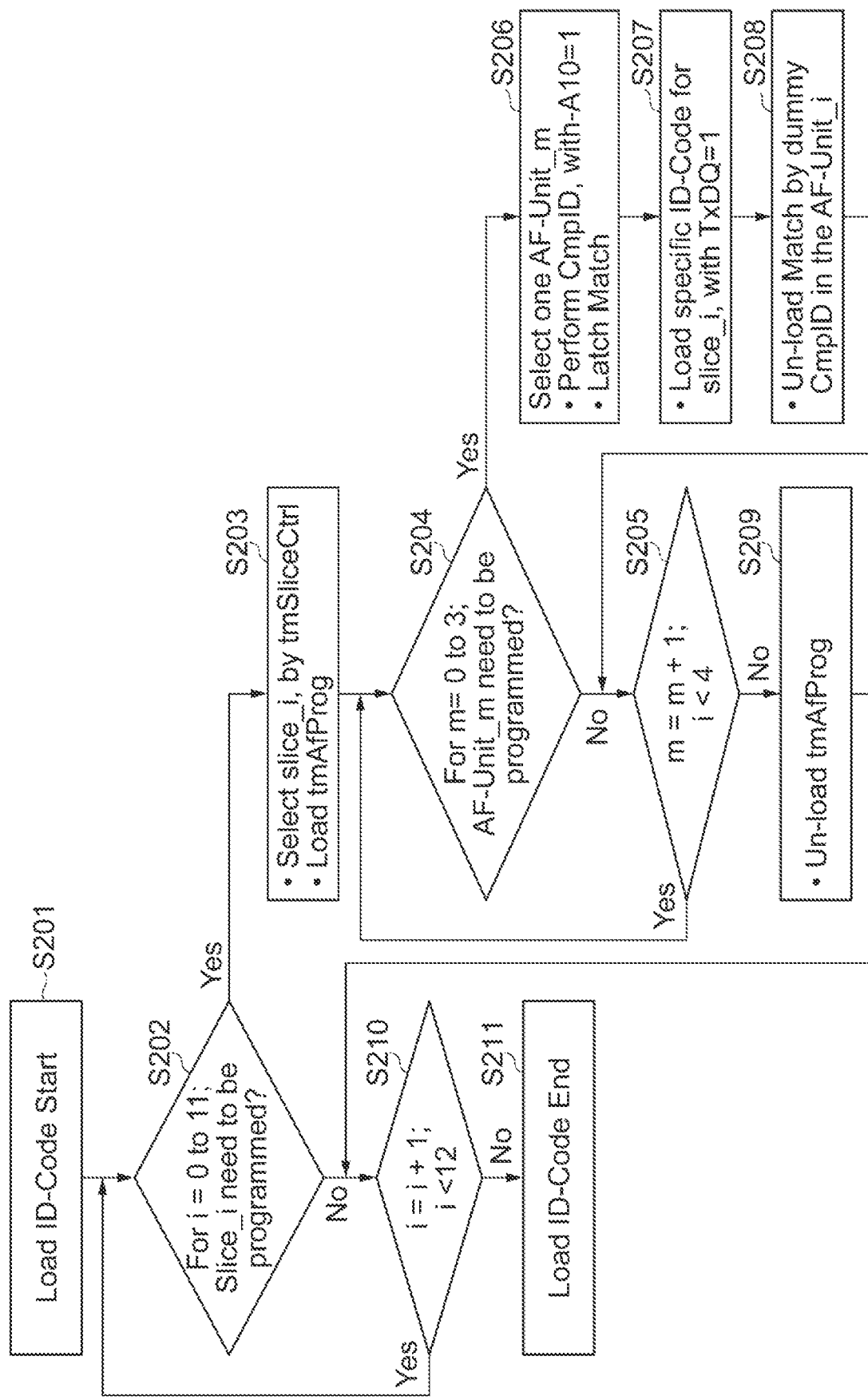
FIG. 7 is a flowchart for explaining a loading method of identification codes.

FIG. 7 is a flowchart for explaining a loading method of the identification code ID-CODE. When a loading operation of the identification code ID-CODE is started (S201), one of the memory chips 100 to 111 is selected (S202). The initial value of the parameter i used for selecting one of the memory chips 100 to 111 is 0, so that the memory chip 100 is selected first. When the memory chip 100 is selected, the chip selection signal tmSliceCtrl[0] corresponding to the memory chip 100 is activated and the test mode signal TestModeCode[14:0] is set to be a value corresponding to the programming signal tmAfProg. With this process, the test mode decoder 120 in the memory chip 100 activates the programming signal tmAfProg while being synchronized with the test clock signal T-CLK (S203). When the programming signal tmAfProg is loaded in the memory chip 100 in this manner, one of the anti-fuse units AFU0 to AFU3 in the selected memory chip 100 is selected (S204). The initial value of a parameter m used for selecting one of the anti-fuse units AFU0 to AFU3 is 0, so that the anti-fuse unit AFU0 is selected first. Subsequently, when any programming operation on the selected anti-fuse unit AFU0 is not required, the value of the parameter m is incremented (S205). As an example, when any programming operation on the anti-fuse units AFU0 to AFU2 is not required and a programming operation on the anti-fuse unit AFU3 is required, a loading operation of the identification code ID-CODE on the anti-fuse unit AFU3 is performed (S206). Bits A13 and A14 included in an address signal are used for selecting one of the anti-fuse units AFU0 to AFU3. The relations among the values of the bits A13 and A14 and the anti-fuse units AFU0 to AFU3 are as shown in FIG. 8. Therefore, when the anti-fuse unit AFU3 is selected, the bits A13 and A14 are both set to be 1.

Figure 9A:
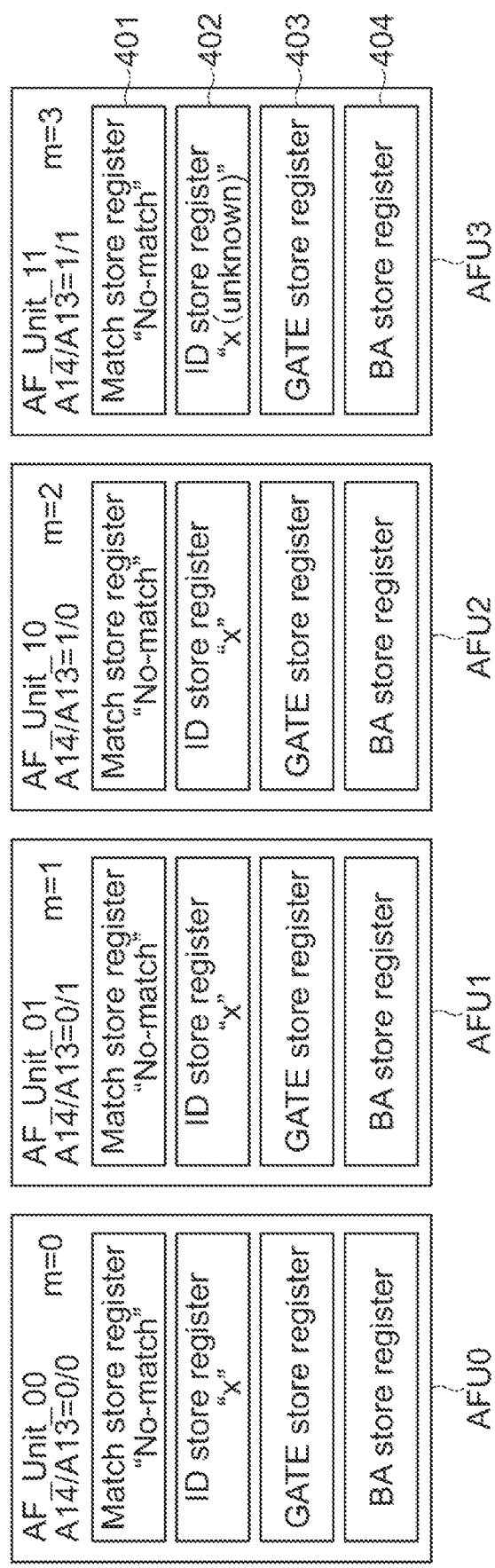
FIGS. 9A to 9D are explanatory diagrams of an example of a loading operation of an identification code.
Figure 9B:
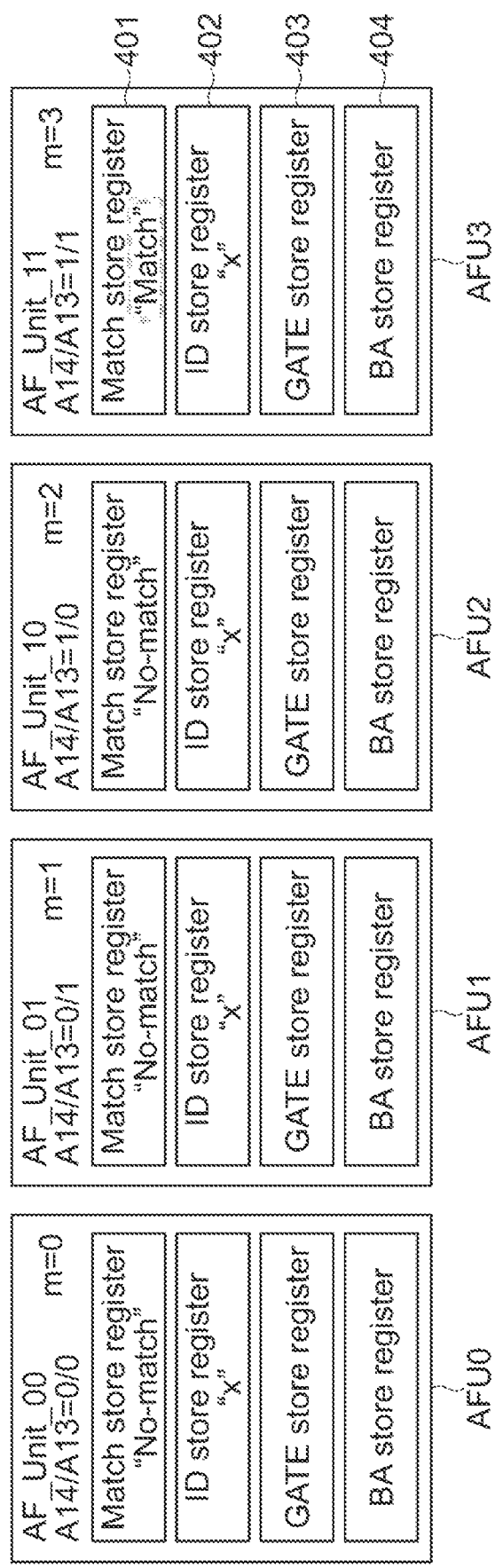
Figure 9C:
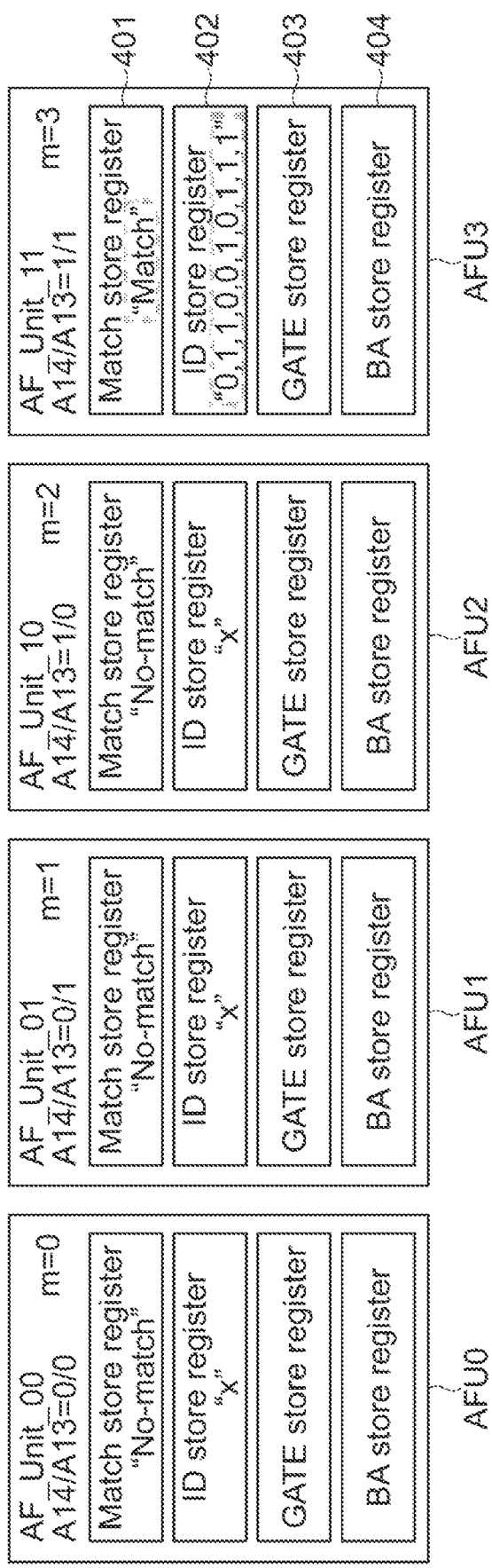
Figure 9D:
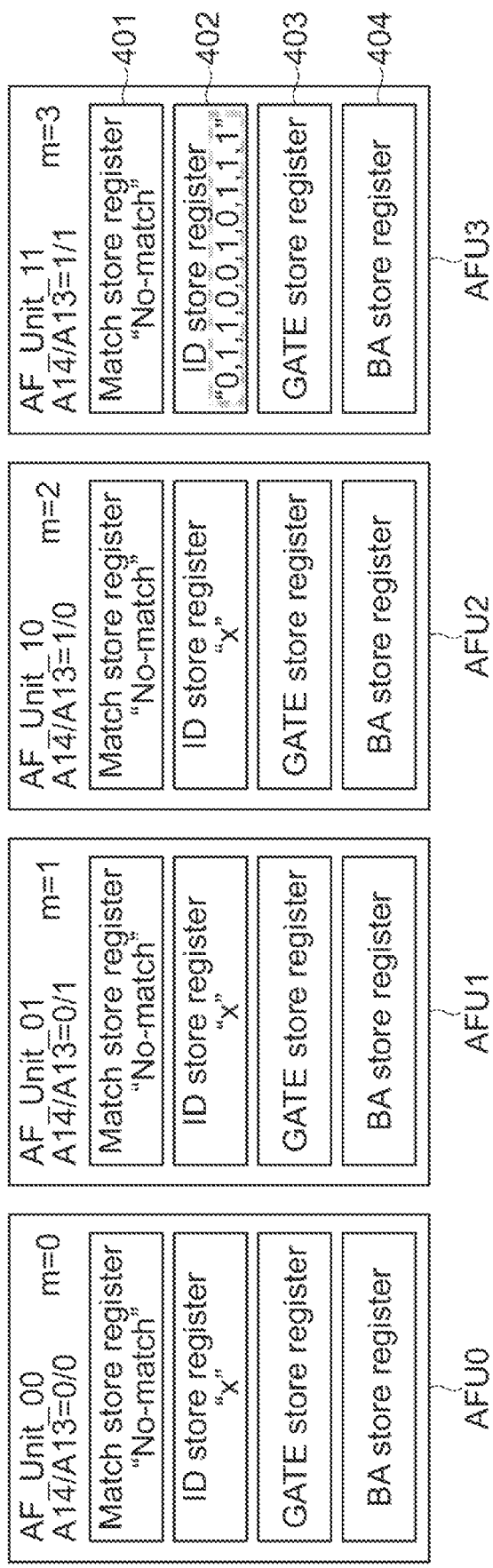

The initial states of the anti-fuse units AFU0 to AFU3 are as shown in FIG. 9A. That is, a match signal MATCH is not retained in any of registers 401 included in the anti-fuse units AFU0 to AFU3, and the identification code ID-CODE is not retained in any of registers 402 included in the anti-fuse units AFU0 to AFU3. When, for example, the anti-fuse unit AFU3 is selected in this state, as a bit A10 included in an address signal is set to be 1, the match signal MATCH is set in the register 401 included in the anti-fuse unit AFU3 as shown in FIG. 9B. Next, the identification code ID-CODE is transferred from the controller chip 200 in a state where TxDQ is set to be 1 (S207). With this process, as shown in FIG. 9C, the identification code ID-CODE is set in the register 402 included in the anti-fuse unit AFU3. In the example shown in FIG. 9C, the value of the identification code ID-CODE is "0110010111". Next, as a dummy identification code ID-CODE is output from the controller chip 200 as shown in FIG. 9D, the match signal MATCH of the register 401 included in the anti-fuse unit AFU3 is reset (S208).

After performing such an operation described above on a memory chip selected from the memory chips 100 to 111, the programming signal tmAfProg is reset (S209) and the value of the parameter i is incremented (S210). As a loading operation of the identification code ID-CODE is performed in this manner on all the memory chips 100 to 111, a series of operations is ended (S211).

Figure 10:
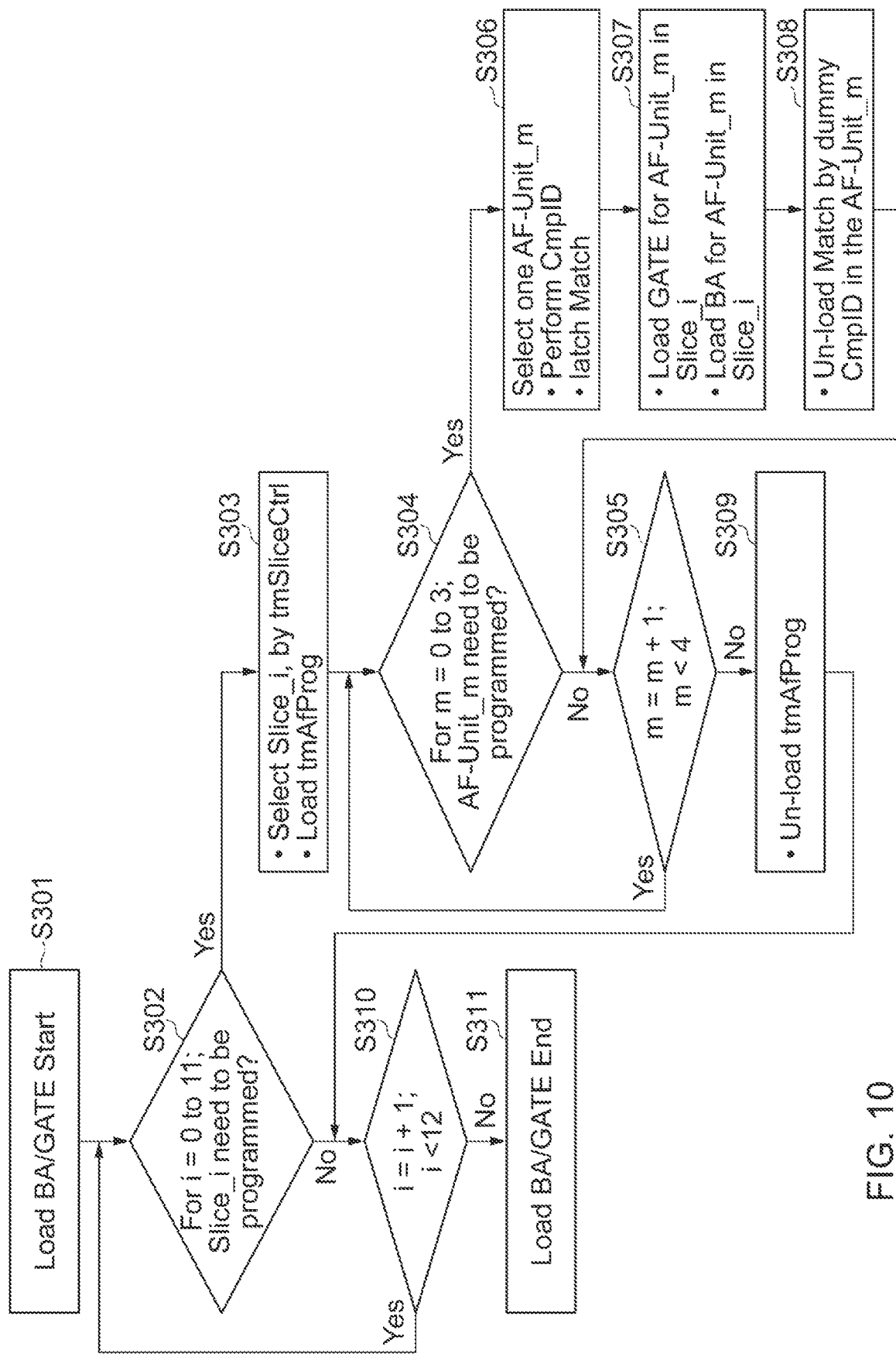
FIG. 10 is a flowchart for explaining a loading method of a gate selection signal and a bank selection signal.
Figure 11:
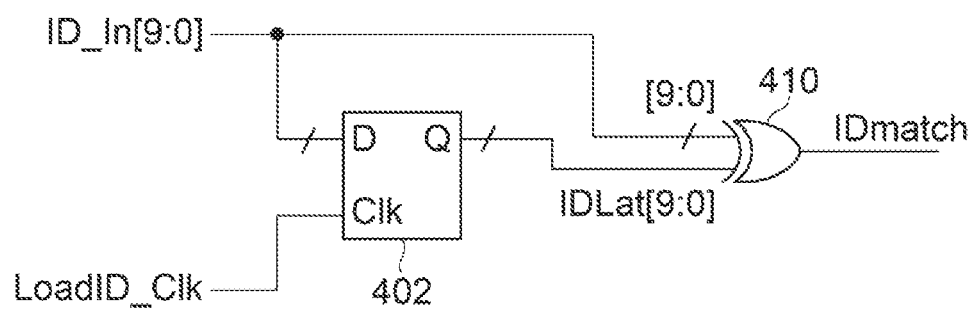
FIG. 11 is a circuit diagram showing a comparison circuit of identification codes.
Figure 12:
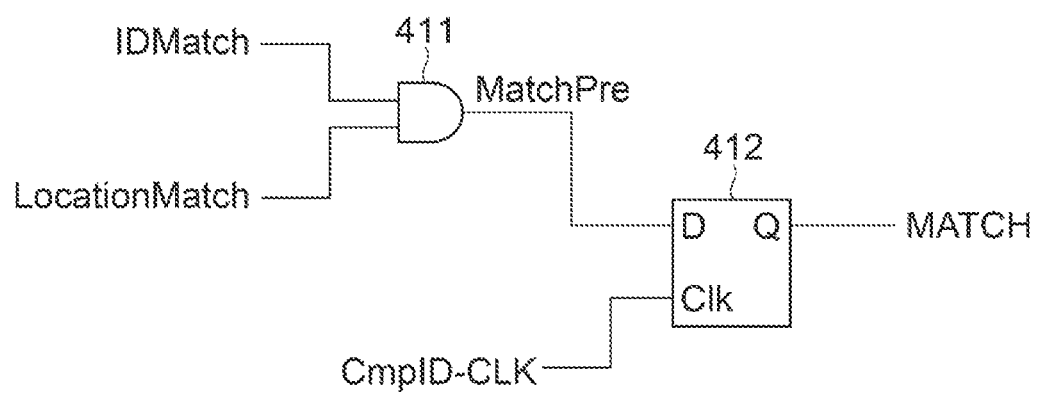
FIG. 12 is a circuit diagram showing a generation circuit of match signals.

FIG. 10 is a flowchart for explaining a loading method of the gate selection signal GATE and the bank selection signal BA. When a loading operation of the gate selection signal GATE and the bank selection signal BA is started (S301), operations shown in Steps S302 to S305 are performed. The operations shown in Steps S302 to 305 are same as the operations described with reference to Steps S202 to S205 shown in FIG. 7. Similarly to the example described above, when any programming operation on the anti-fuse units AFU0 to AFU2 is not required and a programming operation on the anti-fuse unit AFU3 is required, a value same as that of the identification code ID-CODE set in the register 402 in the anti-fuse unit AFU3 is output from the controller chip 200 (S306). As shown in FIG. 11, an identification code ID_In[9:0] supplied from the controller chip 200 is compared with an identification code ID_Lat[9:0] latched on the register 402 by a comparison circuit 410, and when these identification codes match each other, an ID match signal IDmatch is activated. The ID match signal IDmatch is supplied to one of input nodes of an AND gate circuit 411 shown in FIG. 12. A location match signal LocationMatch is supplied to the other input node of the AND gate circuit 411. Subsequently, when the ID match signal IDmatch and the location match signal LocationMatch are both activated, a pre-match signal MatchPre is activated and this activated pre-match signal MatchPre is latched on a latch circuit 412 while being synchronized with a clock signal CmpID-CLK. The output from the latch circuit 412 is the match signal MATCH, and when this output is activated, the match signal MATCH is set in the corresponding register 401.

Figure 13:
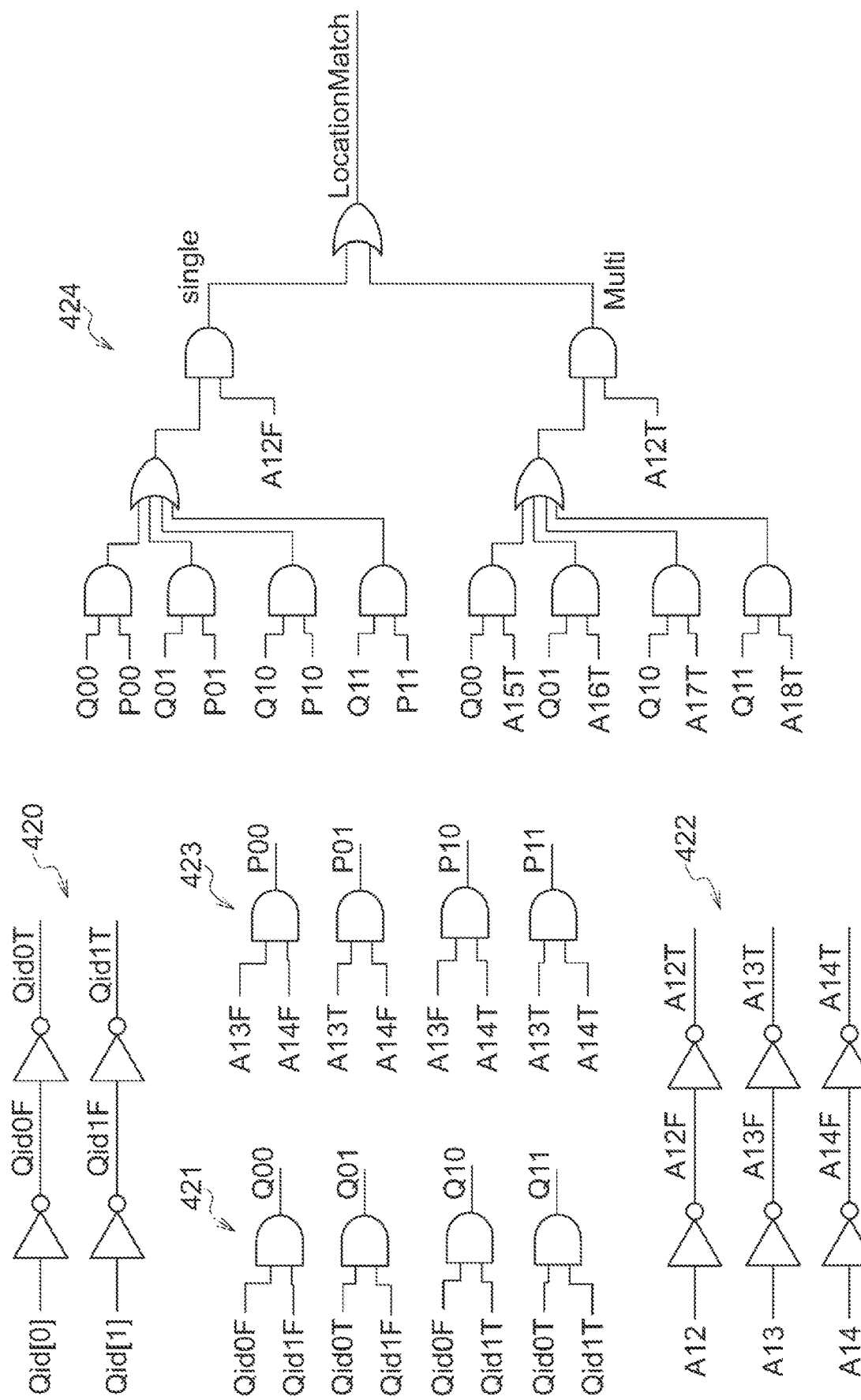
FIG. 13 is a circuit diagram showing a generation circuit of a location match signal.

FIG. 13 is a circuit diagram showing a generation circuit of the location match signal LocationMatch. As shown in FIG. 13, the generation circuit of the location match signal LocationMatch includes gate circuits 420 and 421 that generate 4-bit decode signals Q00, Q01, Q10, and Q11 based on the identification signal Qid[1:0] and gate circuits 422 and 423 that generate 4-bit selection signals P00, P01, P10, and P11 based on the bits A13 and A14 included in an address signal. The selection signals P00, P01, P10, and P11 become valid when the value of a bit A12 included in the address signal is 0, and as the selection signals P00, P01, P10, and P11 are compared with the decode signals Q00, Q01, Q10, and Q11 by a gate circuit 424, the location match signal LocationMatch is generated. This operation is performed when a single anti-fuse unit is selected from the anti-fuse units AFU0 to AFU3. The relations between the bits A13 and A14 and the anti-fuse unit selected from the anti-fuse units AFU0 to AFU3 are as shown in FIG. 8. On the other hand, when the value of the bit A12 is 1, the selection signals P00, P1, P10, and P11 are invalidated and bits A15 to A18 included in the address signal are validated instead. This operation is performed when one or plural anti-fuse units AFU0 to AFU3 are selected in a multiple manner. The relations between the bits A15 to A18 and the anti-fuse units selected from the anti-fuse units AFU0 to AFU3 are as shown in FIG. 14A. Note that, as shown in FIG. 14B, it is possible to use a dedicated selection signal AFSel[3:0] instead of using the bits A15 to A18.

At Step S306 shown in FIG. 10, it is necessary to select a single anti-fuse unit, so that it suffices to set the value of the bit A12 as 0. Alternatively, it is also permissible that the value of the bit A12 is set to be 1 and the values of the bit A15 to A18 are set to be values with which plural anti-fuse units are not selected. When the match signal MATCH is set in the register 401 of a targeted anti-fuse unit at Step S306 shown in FIG. 10, as the gate selection signal GATE and the bank selection signal BA are supplied from the controller chip 200 subsequently, the gate selection signal GATE and the bank selection signal BA are set in registers 403 and 404 of the ant-fuse unit having the match signal MATCH set therein (S307). Next, as a dummy identification code ID-CODE is output from the controller chip 200, the match signal MATCH of the register 401 included in the targeted anti-fuse unit is reset (S308).

After performing such an operation on memory chips selected from the memory chips 100 to 111, the programming signal tmAfProg is reset (S309) and the value of the parameter i is incremented (S310). As the loading operation of the gate selection signal GATE and the bank selection signal BA with respect to all the memory chips 100 to 111 is performed in this manner, a series of operations is ended (S311).

After loading the gate selection signal GATE and the bank selection signal BA in targeted anti-fuse units in this manner, the match signal MATCH is set in the registers 401 included in all the targeted anti-fuse units. In this operation, by setting the value of the bit A12 as 1, with respect to memory chips selected from the memory chips 100 to 111, it is possible to set the match signal MATCH in one or plural anti-fuse units in one operation. With the operation described above (S105 in FIG. 5), the match signal MATCH is set in the registers 401 of all the anti-fuse units that require a programming operation, and the gate selection signal GATE and the bank selection signal BA respectively corresponding to these anti-fuse units are set in the registers 403 and 404.

Figure 15:
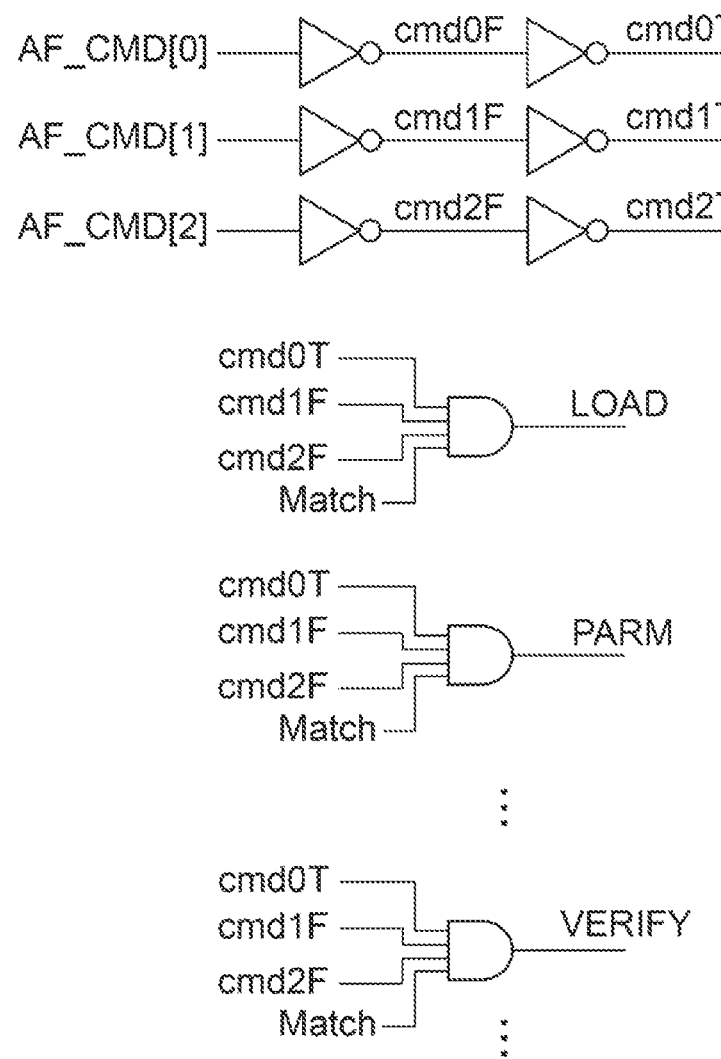
FIG. 15 is a circuit diagram showing a command generation circuit.

Next, the programming signal tmAfProg is reset (S106) and the value of the parameter i is incremented (S107). In this manner, setting of the match signal MATCH, the gate selection signal GATE, and the bank selection signal BA is performed on all the memory chips 100 to 111. Subsequently, when the setting operation on all the memory chips 100 to 111 is completed, the programming signal tmAfProg is loaded in a state where all the memory chips 100 to 111 are selected using the chip selection signal tmSliceCtrl[11:0] (S108). In this state, by issuing commands AF_CMD[2:0] shown in FIG. 15 from the controller chip 200, a blow signal PARM is activated (S109). The commands AF_CMD[2:0] are commands for controlling anti-fuse units, and with a combination thereof, the blow signal PARM as well as a load signal LOAD, a verify signal VERIFY, and the like can be activated. The blow signal PARM is a signal used for activating the gate driver 301, the bank driver 303, and the fuse array driver 305 shown in FIG. 3. Therefore, when the blow signal PARM is activated, in each of the anti-fuse units AFU0 to AFU3 in each of the memory chips 100 to 111, programming is performed simultaneously on anti-fuse cells 300 designated with the gate selection signal GATE and the bank selection signal BA.

Thereafter, when one of the memory chips 100 to 111 is selected using the parameter i and programming is performed in the selected memory chip (S110), the programming signal tmAfProg is loaded in the selected memory chip (S111) and all the match signals MATCH set in the register 401 are reset (S112). In this case, the values of bits A15 to A18 do not need to correspond to the anti-fuse units AFU0 to AFU3 in which the match signals MATCH are set in the register 401 and these values may be dummy values with which all the anti-fuse units AFU0 to AFU3 are selected. Subsequently, the programming signal tmAfProg is reset (S113) and the value of the parameter i is incremented (S114). When programming on anti-fuse arrays selected from the anti-fuse arrays FA0 to FA17 with the parameter k is completed in this manner with respect to all the memory chips 100 to 111, the value of the parameter k is incremented (S115). When programming on all the anti-fuse arrays FA0 to FA17 is completed in this manner, a series of programming operations is ended (S116).

FIG. 16 is a diagram showing an example of a state of anti-fuse units after programming. In the example shown in FIG. 16, programming is performed on the anti-fuse units AFU0 and AFU2 of the memory chip 102, also on the anti-fuse unit AFU1 of the memory chip 108, and also on the anti-fuse unit AFU3 of the memory chip 111. In this example, the anti-fuse arrays as programming targets are FA0, FA3, FA5 to FA7, FA9 to FA11, FA13, and FA14, so that a series of programming operations can be completed by performing 10 programming operations in total (S109). Here, programming on the anti-fuse cell 300 using the blow signal PARM requires a relatively long time such as 30 msec. However, in the present embodiment, since programming can be performed simultaneously on plural anti-fuse units AFU0 to AFU3 in plural memory chips 100 to 111, it is possible to reduce the time required for a series of programming operations.

Figure 17:
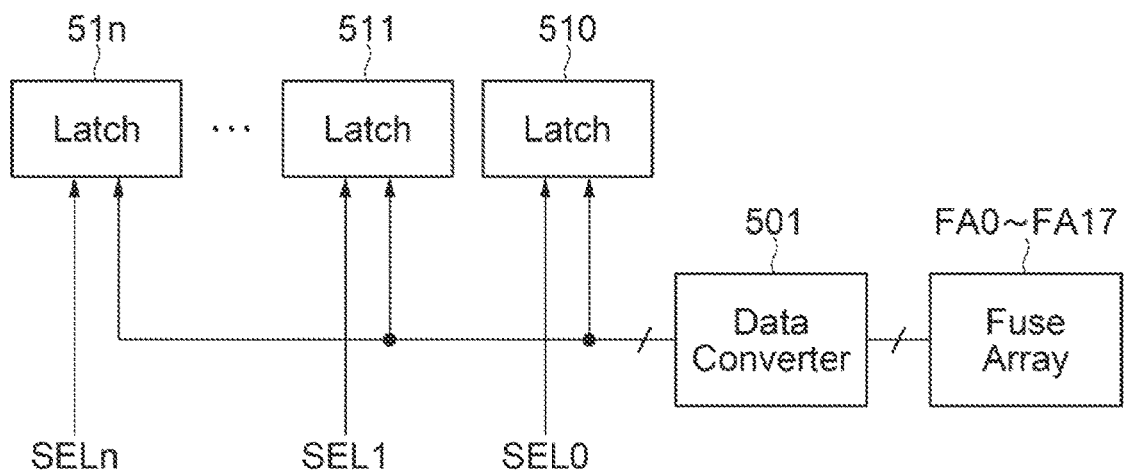
FIG. 17 is a circuit diagram showing a transfer circuit of anti-fuse data read from an anti-fuse array.
Figure 18:
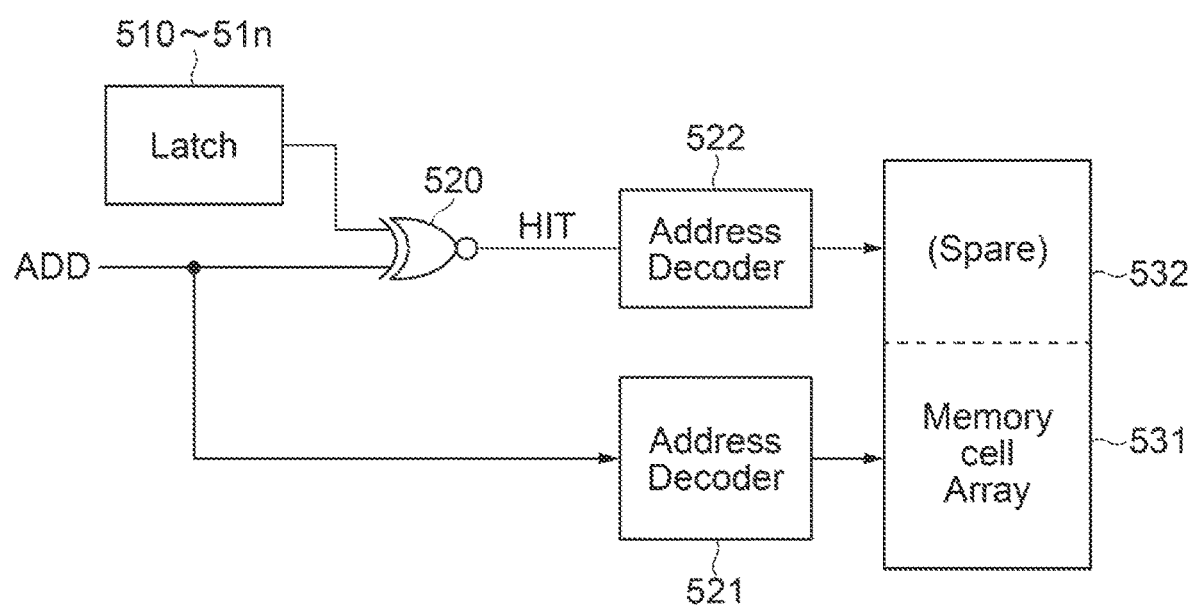
FIG. 18 is a circuit diagram showing a circuit used to access memory cell arrays.

The addresses programmed in the anti-fuse units AFU0 to AFU3 of the memory chips 100 to 111 in this manner are read when a semiconductor memory device is powered on and are transferred to an address latch circuit. For example, when a semiconductor memory device is powered on, as shown in FIG. 17, 18-bit anti-fuse data is read in parallel from the anti-fuse arrays FA0 to FA17 included in the anti-fuse units AFU0 to AFU3. The anti-fuse data is commonly supplied to plural latch circuits 510, 511, ..., 51n via a data converter 501. Corresponding selection signals SEL0, SEL1, ..., SELn are respectively allocated to the latch circuits 510, 511, ..., 51n, and as the selection signals SEL0, SEL1, ..., SELn are sequentially activated, the address of a defective word line and the address of a defective bit line are sequentially latched on a predetermined one of the latch circuits 510, 511, ..., 51n. The addresses transferred to the latch circuits 510, 511, ..., 51n are compared, by an address comparison circuit 520 shown in FIG. 18, with an address ADD supplied from the controller chip 200 at the time of a read operation or a write operation. When these addresses do not match one another, the address ADD is supplied to a main address decoder 521 and access is made to a main memory cell array 531 based on the supplied address ADD. On the other hand, when the address ADD supplied from the controller chip 200 and the addresses latched on the latch circuits 510, 511, ..., 51n match one another, a hit signal HIT is supplied to a redundant address decoder 522 and access is made to a spare memory cell array 532 based on the supplied hit signal HIT.

Although various embodiments have been disclosed in the context of certain preferred embodiments and examples, it will be understood by those skilled in the art that the scope of the present disclosure extends beyond the specifically disclosed embodiments to other alternative embodiments and/or uses of the embodiments and obvious modifications and equivalents thereof. In addition, other modifications which are within the scope of this disclosure will be readily apparent to those of skill in the art based on this disclosure. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying modes of the disclosed embodiments. Thus, it is intended that the scope of at least some of the present disclosure should not be limited by the particular disclosed embodiments described above.

The invention claimed is:

1. An apparatus comprising:
 a first memory chip including a plurality of first fuse units; and
 a controller chip coupled to the first memory chip,
 wherein each of the plurality of first fuse units includes:
  a fuse array having a plurality of fuse cells;
  a first register configured to store a match signal; and
  a second register configured to store a fuse address of one of the plurality of fuse cells,
 wherein the controller chip is configured to
  select one or more of the plurality of first fuse units;
  set the fuse address in the second register included in the selected one or more of the plurality of first fuse units;
  control the first memory chip to set the match signal in the first register included in the selected one or more of the plurality of first fuse units; and
  send a blow signal to the first memory chip, and
 wherein each of the selected one or more of the plurality of first fuse units is configured to blow one of the plurality of fuse cells selected by the fuse address stored in the second register responsive to the blow signal.

2. The apparatus of claim 1, wherein the controller chip is configured to set the fuse address in the second register by sequentially selecting the plurality of first fuse units.

3. The apparatus of claim 2, wherein the controller chip is configured to select one of the plurality of first fuse units based on a first part of address bits when setting the fuse address.

4. The apparatus of claim 1, wherein the controller chip is configured to control the first memory chip to set the match signal in the first register by simultaneously selecting the selected one or more of the plurality of first fuse units.

5. The apparatus of claim 4, wherein the controller chip is configured to select one or more of the plurality of first fuse units based on a second part of the address bits when setting the match signal.

6. The apparatus of claim 1, further comprising a second memory chip including a plurality of second fuse units,
 wherein the controller chip is configured to
  set a fuse address in a second register included in selected one or more of the plurality of second fuse units after setting the fuse address in the selected one or more of the plurality of first fuse units; and
  control the second memory chip to set a match signal in a first register included in the selected one or more of the plurality of second fuse units after setting the match signal in the selected one or more of the plurality of first fuse units.

7. The apparatus of claim 6, wherein the controller chip is configured to send the blow signal in parallel to the first and second memory chips.

8. The apparatus of claim 7, wherein the first and second memory chips are stacked on the controller chip.

9. The apparatus of claim 1, wherein each of the plurality of fuse cells has an anti-fuse structure.

10. An apparatus comprising:
 a first memory chip including a first fuse unit;
 a second memory chip including a second fuse unit; and
 a controller chip that controls the first and second memory chips,
 wherein the first fuse unit includes:
  a first fuse array having a plurality of first fuse cells; and
  a first register configured to store a first fuse address of one of the plurality of first fuse cells,
 wherein the second fuse unit includes:
  a second fuse array having a plurality of second fuse cells; and
  a second register configured to store a second fuse address of one of the plurality of second fuse cells,
 wherein the controller chip is configured to
  set the first fuse address in the first register;
  set the second fuse address in the second register; and
  send a blow signal to the first and second memory chips in parallel,
 wherein the first fuse unit is configured to blow one of the plurality of first fuse cells selected by the first fuse address stored in the first register responsive to the blow signal, and
 wherein the second fuse unit is configured to blow one of the plurality of second fuse cells selected by the second fuse address stored in the second register responsive to the blow signal.

11. The apparatus of claim 10, wherein the controller chip is configured to set the second fuse address in the second register after setting the first fuse address in the first fuse unit.

12. The apparatus of claim 10, further comprising a third memory chip including a third fuse unit,
 wherein the third fuse unit includes:

a third fuse array having a plurality of third fuse cells; and a third register configured to store a third fuse address of one of the plurality of third fuse cells, wherein the controller chip is configured not to set the third fuse address in the third register;

wherein the controller chip is configured to send the blow signal to the first, second, and third memory chips in parallel, thereby ones of the plurality of first and second fuse cells are simultaneously blown without blowing one of the plurality of third fuse cells.

13. The apparatus of claim 12, wherein the first, second, and third memory chips are stacked on the controller chip.

14. An apparatus comprising:
a plurality of memory units; and
a controller chip that controls the plurality of memory units,
wherein each of the plurality of memory units includes:
a memory cell array having a plurality of memory cells; and
a fuse unit configured to store a memory address of a defective one of the plurality of memory cells,
wherein the fuse unit includes:
a fuse array having a plurality of fuse cells;
a first register storing a match signal; and
a second register storing a fuse address of one of the plurality of fuse cells,
wherein the controller chip is configured to control the memory chips to set the match signal in the first register included in one of more of a plurality of fuse units including the fuse unit, set the fuse address in the second register included in the one or more of the plurality of fuse units in which the match signal is stored in the first register, and send a blow signal to the one or more of the plurality of fuse units in parallel, and wherein each of the plurality of fuse units in which the match signal is stored in the first register is configured to blow one of the plurality of fuse cells selected by the fuse address stored in the second register responsive to the blow signal.

15. The apparatus of claim 14, wherein the plurality of memory units are integrated in a single semiconductor chip.

16. The apparatus of claim 14, wherein each of the plurality of memory units is integrated in an associated one of a plurality of semiconductor chips.

17. The apparatus of claim 14,
wherein the plurality of memory units are grouped into a plurality of groups, and
wherein each of the plurality of groups is integrated in an associated one of a plurality of semiconductor chips.

18. The apparatus of claim 17, wherein the plurality of semiconductor chips are stacked on the controller chip.

19. The apparatus of claim 14,
wherein one of the plurality of fuse units is exclusively selected in a first operation mode, and
wherein one or more of the plurality of fuse units are simultaneously selected in a second operation mode.

20. The apparatus of claim 19,
wherein the plurality of fuse units are configured to operate on the first operation mode when setting the fuse address in the second register, and
wherein the plurality of fuse units are configured to operate on the second operation mode when setting the match signal in the first register.

* * * * *